April 9, 1946.　　　　R. H. GODDARD　　　　2,397,999
PROPELLING APPARATUS FOR AIRCRAFT
Original Filed April 15, 1940　　3 Sheets-Sheet 1
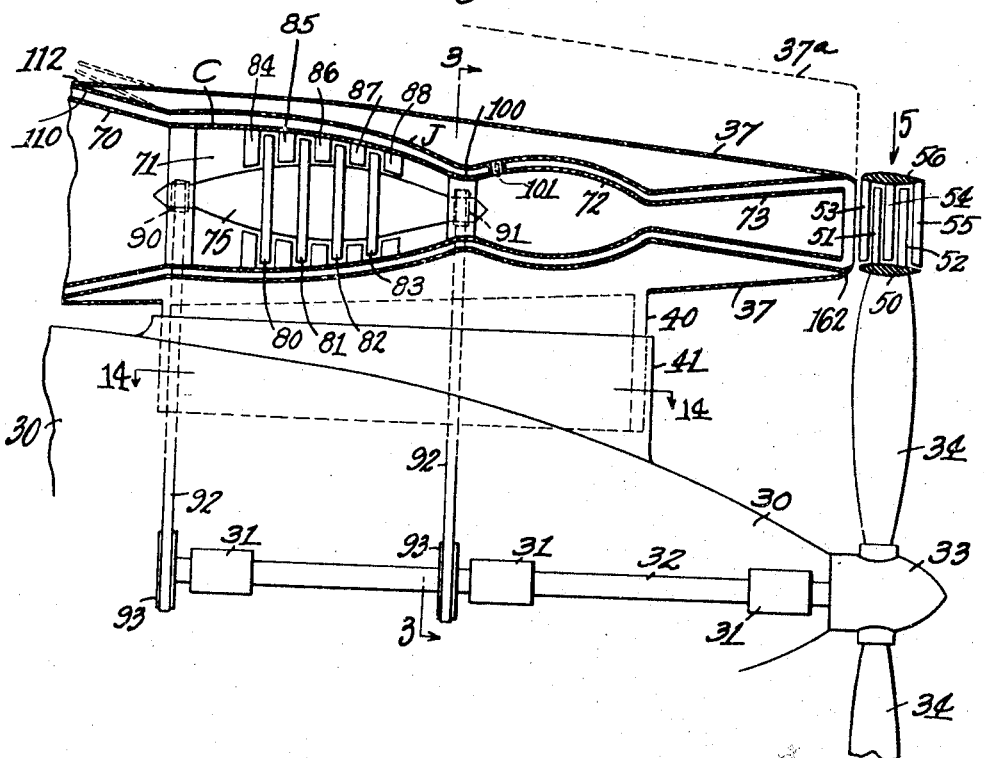
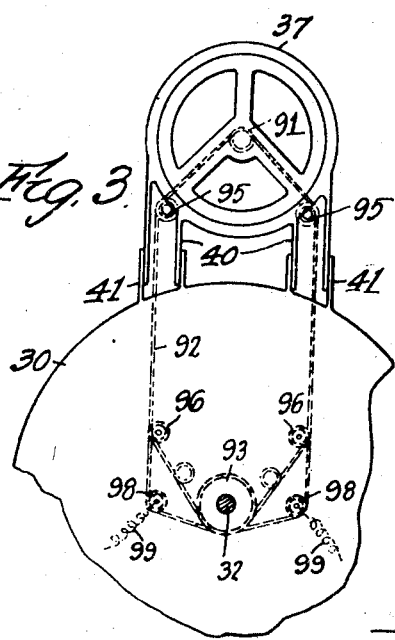
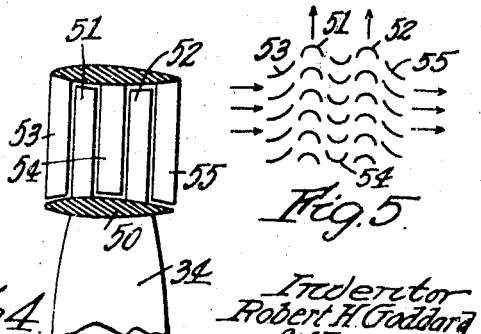
Inventor
Robert H. Goddard April 9, 1946.   R. H. GODDARD   2,397,999
PROPELLING APPARATUS FOR AIRCRAFT
Original Filed April 15, 1940   3 Sheets-Sheet 2
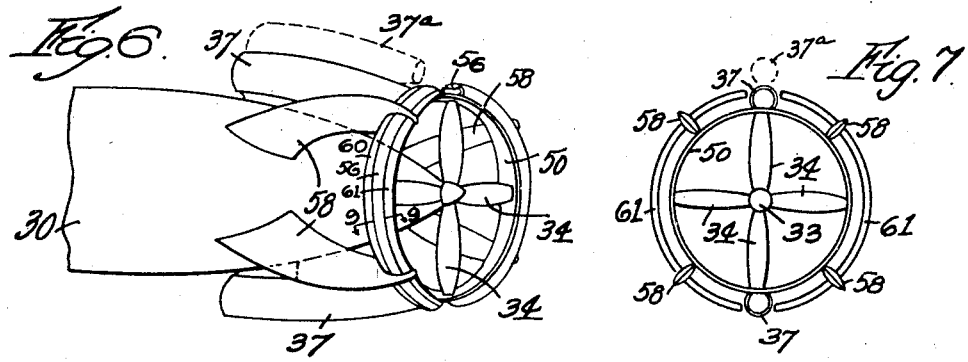
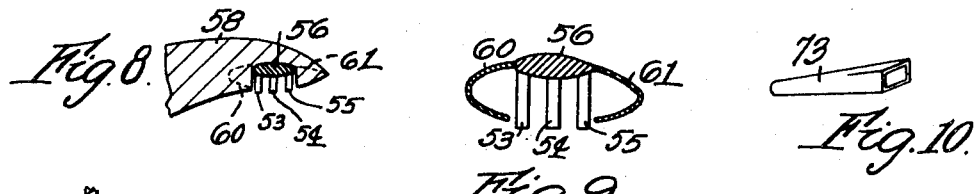
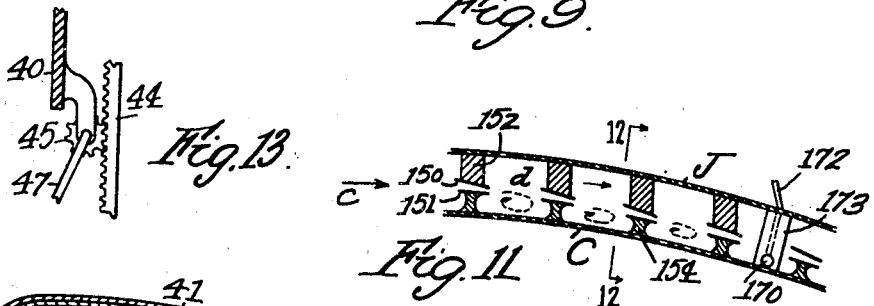
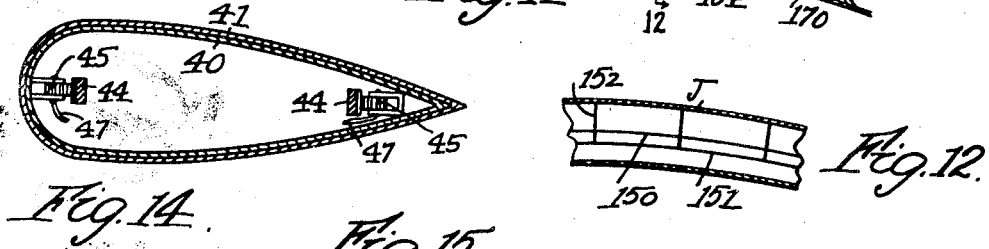
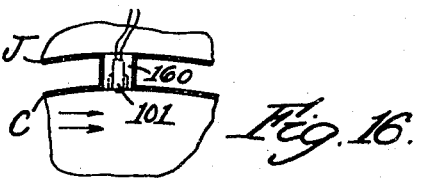
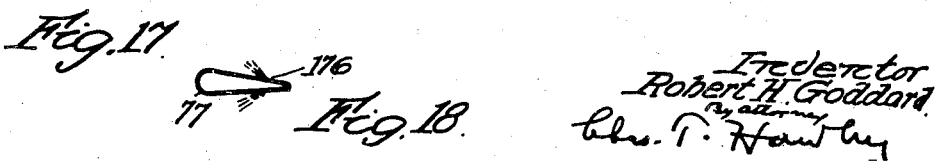

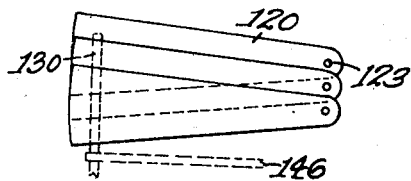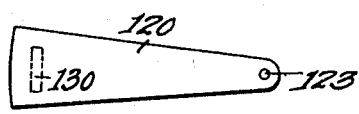
Fig. 19.     Fig. 20.
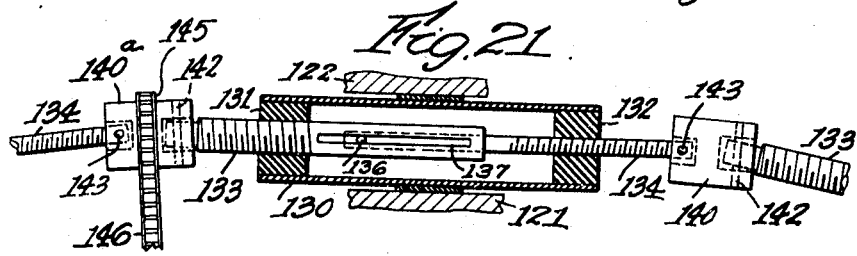
Fig. 21.
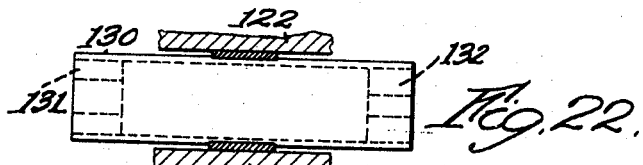
Fig. 22.
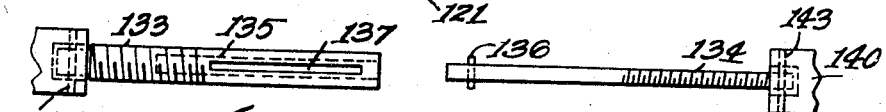
Fig. 23.     Fig. 24.
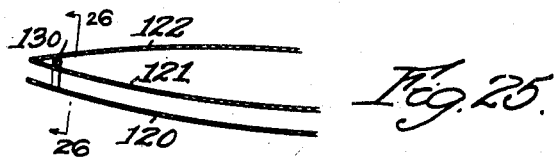
Fig. 25.
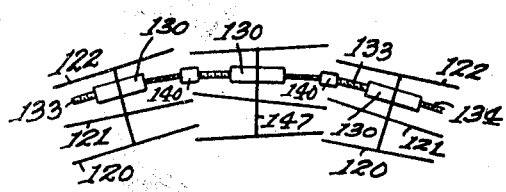
Fig. 26.
Inventor
Robert H. Goddard
by attorney
Chas. T. Hawley Patented Apr. 9, 1946

2,397,999

UNITED STATES PATENT OFFICE 2,397,999

PROPELLING APPARATUS FOR AIRCRAFT

Robert H. Goddard, Roswell, N. Mex.; Esther C. Goddard, executrix of said Robert H. Goddard, deceased, assignor of one-half to The Daniel and Florence Guggenheim Foundation, New York, N. Y., a corporation of New York Original application April 15, 1940, Serial No. 329,710. Divided and this application September 27, 1940, Serial No. 358,593

7 Claims. (Cl. 170—135.5)

This application is a division of my original application Serial No. 329,710, filed April 15, 1940, and relates to aircraft of the type in which a rocket blast provides selective propulsion, either by direct rocket operation or by coaction with turbine blades against which the rocket blast may be directed and which blades are associated with an aircraft propeller of the usual type.

This general combination in an aircraft is shown in my prior Patents No. 1,809,271 and No. 1,929,778. In such apparatus, the turbine and propeller provide efficient operation at relatively low speeds, and the direct rocket blast provides efficient operation at high speeds or at high altitudes with relatively thin atmosphere.

It is the general object of my present invention to improve the construction shown in my prior patents and to effect more efficient and economical operation and easier adaptation to varying operative conditions.

More specifically, I have simplified the devices for shifting the apparatus from propeller operation to rocket operation and vice-versa, and I have constructed all parts of the apparatus to reduce air-resistance as much as possible.

My invention further relates to arrangements and combinations of parts which will be hereinafter described and more particularly pointed out in the appended claims.

A preferred form of the invention is shown in the drawings, in which:

Fig. 1 is a partial longitudinal section of an aircraft embodying my improved construction;

Fig. 2 is a diagrammatic view showing the arrangement of blades in the compressor turbine;

Fig. 3 is a transverse sectional view, taken along the line 3—3 in Fig. 1;

Fig. 4 is a detail sectional view, taken through the propeller turbine;

Fig. 5 is a diagrammatic view, looking in the direction of the arrow 5 in Fig. 1 and showing the arrangement of propeller turbine blades;

Fig. 6 is a partial perspective view, showing the streamlined propeller turbine casing and its supports;

Fig. 7 is a rear elevation of the propeller and casing;

Fig. 8 is a partial longitudinal section of one of the propeller supports;

Fig. 9 is a detail sectional view, taken along the line 9—9 in Fig. 6;

Fig. 10 is a perspective view of a rocket nozzle;

Fig. 11 is a longitudinal sectional view, showing cooling devices to be described;

Fig. 12 is a transverse sectional view, taken along the line 12—12 in Fig. 11;

Fig. 13 is a side elevation of means for adjusting the rocket apparatus radially of the aircraft;

Fig. 14 is a sectional view, taken along the line 14—14 in Fig. 1;

Fig. 15 is a partial sectional view, showing fuel feeding mechanism;

Fig. 16 is a partial longitudinal section of the combustion chamber;

Fig. 17 is a detail perspective view, showing the rear supporting bearing of an air compressor;

Fig. 18 is a detail sectional view, taken along the line 18—18 in Fig. 17;

Fig. 19 is a plan view of certain vanes associated with the front or air intake portion of the rocket apparatus;

Fig. 20 is a plan view of a single vane;

Fig. 21 is a sectional view of mechanism provided for adjusting the air intake vanes;

Fig. 22 is a side elevation of a sleeve with which the adjusting mechanism coacts;

Figs. 23 and 24 are side elevations of certain parts shown in Fig. 21;

Fig. 25 is a longitudinal sectional view to be described; and

Fig. 26 is a transverse sectional view, taken along the line 26—26 in Fig. 25.

Referring particularly to Figs. 1, 3 and 6, my improved aircraft comprises a main aircraft body 30 having bearings 31 for a shaft 32 supporting a propeller 33 with blades 34 of the usual aircraft type. Rocket enclosures 37, preferably two in number, are mounted at opposite sides of the aircraft body 30 and are supported for radial adjustment by telescoping streamlined supporting members 40 and 41 (Figs. 1, 3 and 14). The outward position of one of the enclosures 37 is indicated at 37ᵃ in Figs. 1 and 6.

The aircraft body 30 is provided with rack bars 44 (Fig. 13) engaged by pinions 45 mounted on the movable telescoping member 40. These pinions are conveniently operated by flexible shafts 47 connected to a common source of power, so that they will rotate simultaneously and will move both ends of the member 40 inward or outward at the same rate and without binding.

When the rocket apparatus is in the inner position shown in section in Fig. 1, the rocket blast coacts with turbine blades associated with the propeller 33 and drives the propeller by turbine action. The construction of the propeller turbine comprises a rim or band 50 of streamlined cross section, supported concentric with the shaft 32 and mounted at the outer ends of the blades 34. Two sets of rotating turbine blades 51 and 52 are mounted on the band 50 and project outward therefrom to coact with sets of fixed blades 53, 54 and 55 extending inward from an outer band 56, mounted in fixed position at the rear of the main body 30.

The band 56 is supported by streamlined arms 58 (Fig. 6), and the entire turbine construction is enclosed by front and rear streamlined casing members 60 and 61 (Fig. 9). These casing members are united with the outer band 56 and collectively form a streamlined structure, except at those portions where the rocket blasts are directed against the turbine blades. The arms 58 also support the casing members 60 and 61 and form partitions therein, except in the portion occupied by the band 56 and the fixed turbine blades.

My improved rocket apparatus comprises a rocket casing C, best shown in Fig. 1, and including an entrance or air-intake portion 70, a compressor portion 71, a combustion chamber 72 and an expansion nozzle 73. The casing C is provided with a jacket J (Fig. 1) corresponding in section to the section of the rocket apparatus but spaced therefrom for cooling purposes to be described.

The compressor 71 comprises a streamlined rotated member 75, mounted in bearings 76 (Fig. 17) which are secured by hollow fins 77 (Figs. 17 and 18) to the casing C at the opposite ends of the compressor portion 71. The fins 77 are streamlined as shown in Fig. 18 to provide minimum resistance to air flow.

The rotated member 75 is provided with four sets of turbine blades 80, 81, 82 and 83, which blades rotate between five sets of fixed blades 84, 85, 86, 87 and 88. The rotated member 75 is provided with pulleys or sprockets 90 and 91, connected by belts or chains 92 to driving pulleys or sprockets 93 on the propeller shaft 32.

Special provision is made for continuous driving of the compressor member 75, when the rocket apparatus occupies either an inner, outer or intermediate position. For this purpose, guide pulleys 95 (Fig. 3) for the belts or chains 92 are fixed in the movable rocket support 40, and fixed guide pulleys 96 are provided in the aircraft body 30. Additional guide pulleys 98 are movably mounted in the body 30 and are pulled yieldingly outward by springs 99. The guide pulleys 98 are thus yieldingly movable from the full line to the dotted line position in Fig. 3, and thus permit the belts or chains to yield but still maintain continuous driving contact with the compressor member 75, when the rocket apparatus is in any selected position. It will be noted that this take-up mechanism does not call for any reversal of motion in the belts or chains 92, which is a matter of considerable importance in high speed operation.

The compressor portion 71 of the casing C is gradually contracted rearward, as shown in Fig. 1, and the outer diameter of the sets of fixed and movable blades is also progressively contracted rearward. It will be noted, however, that all of the movable blades are of substantial radius, and that they are longer and consequently travel faster at the front end where the air is under less pressure and of greater bulk.

The cross section and operation of the successive sets of blades in the compressor is best shown in Fig. 2, where the entering air is indicated by the arrow $a$ and the air discharged from the compressor is indicated by the arrow $b$. It will be noted that the air enters and leaves the compressor substantially along the line of its longitudinal flow through the rocket apparatus.

The fixed blades 84 deflect the air sidewise without shock, and the moving blades 80 tend to reverse the direction of air flow and deliver the air to the fixed blades 85, where the direction of flow is again reversed. Substantially the same operations are repeated in the succeeding sets of blades, with the last fixed set 88 deflecting the air to approximately axial discharge.

It will be noted that the exit ends of the moving blades are less widely spaced than the entering ends, so that the air is successively compressed as it leaves each set of moving blades. This compressive effect is further increased by the fact that the diameters of the successive sets of blades are progressively reduced, as indicated in Fig. 1.

The design of the turbine blades is thus such that the blades tend to compress the air and force it rearward, rather than to give it high velocity. The changes in direction of air flow are also designed to utilize the inertia of the air to assist in increasing its density.

Fuel is delivered to the apparatus in the reduced portion 100 (Fig. 1) between the compressor portion 71 and the combustion chamber 72, at which portion 100 the air is highly heated by adiabatic compression. A spark-plug 101 is provided for initial ignition of the mixed air and fuel vapor, and the combustion chamber is expanded rearward to its middle portion to permit initial expansion of the highly heated combustion gases.

At its rear portion, the chamber 72 is contracted and delivers the combustion gases under pressure to the nozzle 73, which is of substantial length and which has a relatively long taper. The nozzle 73 is preferably of the shape shown in Fig. 10, with a circular cross section at the intake and with a rectangular cross section at the delivery end. This rectangular cross section delivers the rocket blast more effectively to the turbine blades.

When the rocket apparatus is in the inner position shown in Fig. 1, the rocket blast is directed against the turbine blades and between the bands 50 and 56. The aircraft is then operated very largely by the propeller blades 34 and only to a relatively slight extent by the direct rocket blast. This method of operation is preferred when starting or when operating at relatively slow speed.

As the speed increases, the rocket apparatus may be moved outward so that it partly or wholly clears the propeller turbine structure. The streamlined section of the band 56 permits a portion of the blast to be sent through the turbine blades, while the outer portion of the blast is discharged directly against the atmosphere.

The ends of the blades are shaped to conform to the streamlined section of the bands 50 and 56 and to provide minimum clearance, as shown in Fig. 4.

The cross section of the turbine blades and the operation thereof is clearly shown in Fig. 5 where the fixed blades 53 deflect the entering air sidewise or in the direction of turbine rotation, the movable blades 51, the fixed blades 54 and the movable blades 52 successively reverse the direction of air flow, and the fixed blades 55 deflect the air to a discharge direction substantially parallel to the rocket axis. This arrangement for directing the flow of the combustion gases is most effective in utilizing a large part of the kinetic energy of the gases in producing rapid rotation of the propeller. There is little or no compression of the combustion gases in the rocket blast.

It is desirable to vary the size of the front opening of the entrance portion 70 of the rocket casing, so that a varying amount of air may be received in accordance with varying operative conditions. For instance, at higher altitudes and in a thinner atmosphere, more air should enter the rocket apparatus than at lower elevations or where the atmosphere is more dense. On the other hand, an increase in speed without change of atmospheric density would produce an undesired increase in the amount of air delivered to the combustion chamber, if no adjustment were provided. I accordingly provide the special construction shown on sheet 3 of the drawings, by which the front opening of the air entrance portion of the rocket apparatus may be increased or decreased as desired.

The entrance portion 70 of the casing C (Fig. 1), the entrance portion 110 of the jacket J, and the entrance portion 112 of the enclosure 37 are each formed of circular overlapping vanes 120, 121 and 122 (Figs. 25 and 26) respectively. These vanes are each pivoted at their rear ends as indicated at 123 (Figs. 19 and 20), and at their free ends they are secured in assembled relation as shown in Fig. 26.

A sleeve 130 is secured between each pair of associated vanes 121 and 122 and is disposed circumferentially within the outer casing 37. Collars 131 and 132 are mounted in the ends of each sleeve 130 and are provided with right and left-hand threads which respectively receive adjusting screws 133 and 134. The screw 133 is provided with an unthreaded axial recess 135 which permits the screw 134 to telescope therein, and the screw 134 is provided with a cross-pin 136 slidable in elongated slots 137 in the screw 133.

A sleeve 130 and associated right and left-hand screws are provided for each assembled set of vanes 120, 121 and 122 as shown in Fig. 26, and coupling members 140 are provided between the adjacent sets. The adjacent ends of the screw 133 of one set and the screw 134 of the next set are loosely connected to one of the coupling members 140 by pins 142 and 143, disposed at right angles therein. The couplings 140 thus form universal joints between the ends of adjacent screws.

One of the couplings 140a may be provided with sprocket teeth 145 engaged by a chain 146 and by which chain the couplings 140 and associated parts may be rotated manually or from any suitable source of power. The associated vanes 120 and 121 are held at a fixed distance apart radially by connecting studs 147, so that the cooling space between the casing C and the jacket J may remain of constant radial thickness.

When the couplings and screws are rotated in the collars 131 and 132 of the sleeves 130 on the several sets of vanes, the associated screws 133 and 134 will be telescopically contracted or expanded, according to the direction of rotation. Consequently, the several sets of vanes will be drawn toward each other or pushed apart at their free or entrance ends, thus contracting or expanding the bell-shaped mouth of the casing portion 70. When the vanes are expanded, the compressive effect on the air is correspondingly increased.

In order to produce effective circulation of air in the jacket space, I provide circumferential bands 150 and 151 (Figs. 11 and 12) in the space between the casing C and the jacket J. The outer band 150 is of somewhat conical section, as indicated in Fig. 11, and is supported within the jacket J by streamlined radial struts 152 (Fig. 12). The bands 151 are substantially cylindrical in shape and are supported by circumferential rings 154 having the double concaved section shown in Fig. 11.

As air enters the jacket space in the direction of the arrow $c$ in Fig. 11, it passes between the bands 150 and 151 and is directed inward by the conical band 150 so that it whirls about as indicated by the arrows $d$ in the spaces between the rings 154 and is brought definitely in contact with the casing C of the compressor portion 70 and combustion chamber 72, thus effectively cooling these surfaces.

If the parts 150 to 154 were omitted, the heated air would remain in close contact with the surface of the casing C. This would be particularly true around the combustion chamber 72, where centrifugal force would tend to move the colder and heavier air outward and to retain the lighter heated air in contact with the casing C.

In order to prevent interference with the flow of air and gases in the casing C, the spark-plug 101 is preferably mounted in a recess 160 (Fig. 16) formed between the casing C and the jacket J and suitably streamlined.

The rear edge 162 (Fig. 1) of the jacket J is preferably curved inward to produce a jet or aspirator effect at the rear end of the jacket and adjacent the rocket blast from the nozzle 73.

The means provided for admission of liquid fuel to the combustion chamber 72 is best shown in Figs. 15, 17 and 18. An annular fuel feed pipe 170 surrounds the casing C at the portion 100, and is provided with a streamlined covering 171. A fuel connection 172 from a suitable fuel storage is led to the pipe 170 through a streamlined strut 173 (Fig. 11). Spray openings or nozzles 175 deliver jets or fine sprays of fuel forward into the stream of compressed air moving rapidly rearward through the casing portion 100.

For more effective mixing of the fuel and air, I utilize the hollow struts 77 of the rear bearing 76 of the compressor 75. These hollow struts are connected to the pipe 170 and are provided with additional openings or nozzles 176 in their side walls, from which additional jets or sprays are delivered as indicated in Fig. 18. Jets of gasoline or other liquid fuel are thus effectively distributed through the air stream, so that a very complete and uniform mixture is immediately attained.

Having described the details of construction of my improved apparatus, it is believed that the method of operation of the several parts will be readily apparent. It is particularly advantageous that the turbine 50 is operated by gas which has been cooled by expansion through the relatively long nozzle 73.

Having thus described my invention and the advantages thereof, I do not wish to be limited to the details herein disclosed, otherwise than as set forth in the claims, but what I claim is:

1. In an aircraft, a rocket apparatus, a propeller having a turbine mechanism positioned to intercept the blast from said rocket apparatus, and means to move said rocket apparatus radially outward in said aircraft beyond the locus of operation of said turbine construction.

2. In an aircraft, a body, rocket apparatus mounted on said body and radially adjustable toward and from said body, a propeller, a propeller shaft mounted in said body, turbine mechanism mounted on said propeller shaft and positioned to intercept the blast from said rocket apparatus, and streamlined telescoping supporting members between said body and said rocket apparatus.

3. In an aircraft, a body, a rocket apparatus mounted on said body and radially adjustable toward and from said body, a propeller, a propeller shaft mounted in said body, turbine mechanism mounted on said propeller shaft and positioned to intercept the blast from said rocket apparatus, streamlined telescoping supporting members between said body and said rocket apparatus, and means to move all parts of said rocket apparatus simultaneously and at the same rate inward and outward relative to said body.

4. In an aircraft having a propeller and a propeller shaft, rocket apparatus mounted at the side of said craft and radially adjustable toward and from said propeller shaft, an air compressor in said rocket apparatus, turbine mechanism mounted on said shaft and positioned to intercept the blast from said rocket apparatus, and means to drive said air compressor from said propeller shaft in all adjusted radial positions of said rocket apparatus.

5. In an aircraft, a propeller shaft, turbine mechanism to drive said shaft, a rocket apparatus mounted for radial adjustment toward and from said shaft and turbine mechanism, an air compressor in said rocket apparatus, a belt drive from said shaft to said compressor, and take-up means for said belt which yieldingly keeps the belt under tension in all adjusted radial positions of said rocket apparatus.

6. In an aircraft, a rocket apparatus, a propeller having a turbine mechanism positioned to intercept the blast from said rocket apparatus, means to move said rocket apparatus radially outward in said aircraft beyond the locus of operation of said turbine construction, a belt drive from said shaft to said compressor, take-up guide pulleys engaging portions of said belt, and means to move said pulleys yieldingly away from each other to tension said belt in all positions of the rocket apparatus.

7. In an aircraft, a rocket apparatus, a propeller, and an associated peripheral turbine mechanism interposed in the path of the rocket blast, said turbine mechanism comprising movable blades mounted on said propeller and fixed blades mounted on a fixed encircling band having a streamlined section which reduces interference with the rocket blast, the outer ends of the movable blades being curved to conform to the streamlined section of the fixed encircling band and thereby reducing leakage at the ends of said blades.

ROBERT H. GODDARD.